Nov. 29, 1927.
J. BING
1,650,594
VARIABLE SPEED GEAR
Filed Sept. 5, 1924
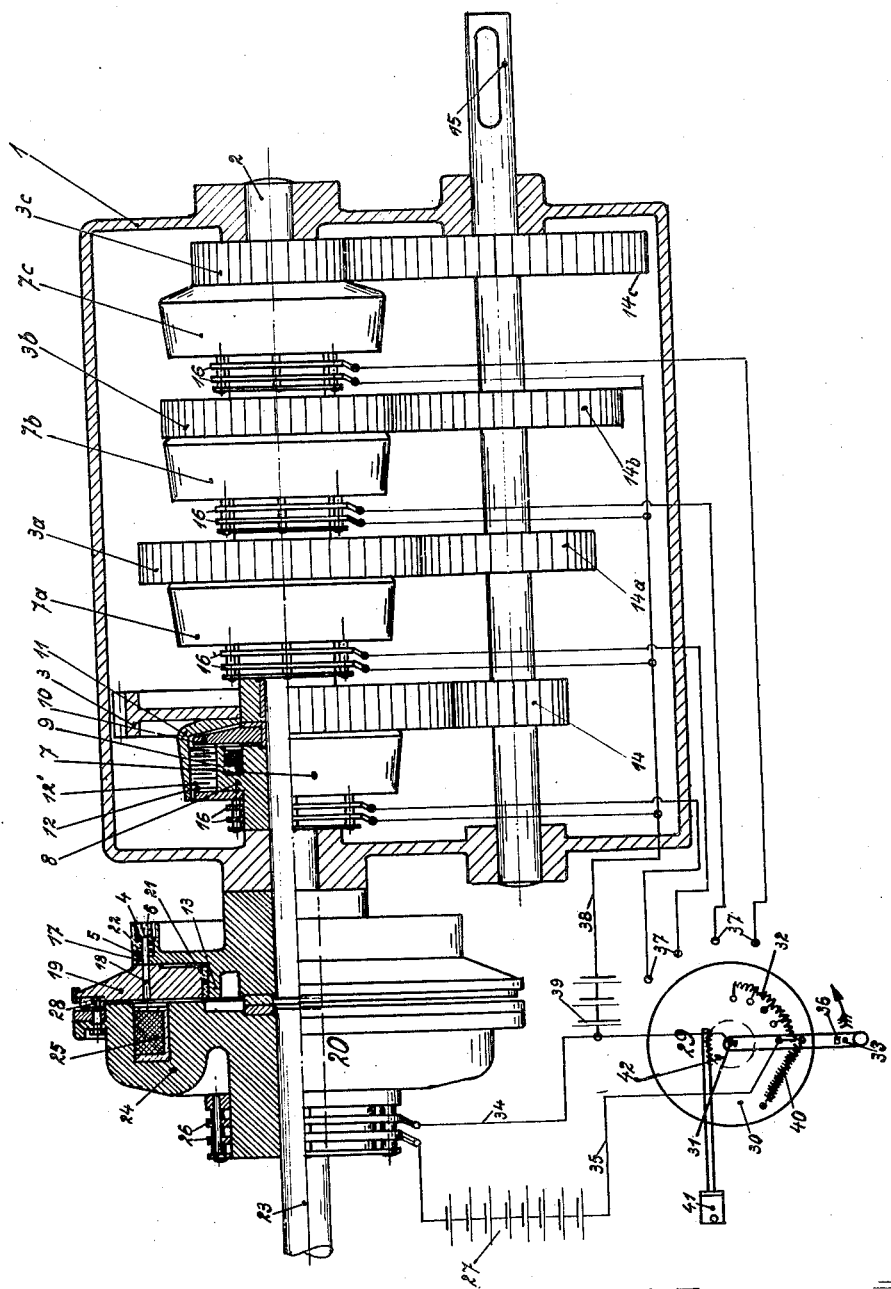
Inventor
J. Bing
By Marks & Clerk Patented Nov. 29, 1927.

1,650,594

UNITED STATES PATENT OFFICE.

JULIUS BING, OF EISENACH, GERMANY, ASSIGNOR TO MAGNET-WERK G. M. B. H. EISENACH SPEZIALFABRIK FÜR ELEKTROMAGNET-APPARATE, OF EISENACH, GERMANY.

VARIABLE-SPEED GEAR.

Application filed September 5, 1924, Serial No. 736,118, and in Germany March 13, 1924.

This invention has reference to a method and means of varying the rotating speed of a shaft and in particular to variable-speed gears operated by means of electro-magnetic clutches, such as may be used among other purposes for the driving of locomotive engines with Diesel motors and for similar operating systems of the kind referred to, and it is intended to avoid the drawback caused by the jars and other difficulties occurring in the operation of the clutch, and to generally improve the construction of machinery of the kind referred to and to facilitate the manipulation thereof. Broadly speaking, the invention may be applied with advantage in all cases, where it is of importance to produce the coupling of a power engine which, under general conditions, is not readily started under load or the number of rotations of which cannot be regulated or only with difficulty with a shaft the number of rotations of which is to be varied within wide limits.

The invention is shown by way of example and in a somewhat diagrammatic view upon the accompanying drawing in a partially longitudinal section through the particular variable speed gear representing an embodiment of the principles of the invention, the arrangement for the varying of the strength of exciting current of the main coupling clutch being shown rather conventionally.

The gear mechanism mounted in the casing 1 comprises the primary shaft 2 with the gear wheels 3, 3ª, 3ᵇ, 3ᶜ, loosely rotatable thereon and also axially displaceable within certain limits, and with the corresponding electro-magnetic coupling means 7, 7ª, 7ᵇ, 7ᶜ. These latter are formed as laminar couplings as appears from the sectional representation of the coupling member 7 situated farthest to the left. Each of these couplings consists of a magnet 8 the body portion of which is keyed to the shaft 2 and of an exciter winding 9 mounted on the magnet to which electric current is admitted by the sliding rings 16, and it also comprises an armature disc 10 disposed with axial displacement in front of the poles of the magnet body upon the shaft 2 and a substantially bell shaped member 11 enclosing the entire combination of parts and rigidly connected to the corresponding gear wheel 3, 3ª, 3ᵇ and 3ᶜ respectively. Upon the outer periphery of the magnet body 8 and on the other hand upon the inner periphery of the bell-shaped body 11 a group of frictional rings or annular discs 12 and 12' are respectively mounted in such a manner that a ring of one of the said groups alternates with the ring of the other group. The rings or discs are adapted to be axially displaceable with relation to their carriers, that is to say, the magnet body 8 on the one hand and the bell shaped body 11 on the other hand, but they are prevented from rotation in the peripheral direction. Upon the armature 10 being attracted by the excitement of the winding 9, the armature forces the rings 12, 12' together, thereby causing the frictional engagement and consequently the coupling between the particular gear wheel, the wheel 3 for instance and the shaft 2. The gear wheels 3, 3ª, 3ᵇ and 3ᶜ are in permanent engagement with the gear wheels 14, 14ª, 14ᵇ, 14ᶜ keyed to the secondary shaft 15. The entire train of gearing is closely surrounded by the casing 1 and the casing itself is filled with oil in the well-known manner for the lubrication of the co-operating members and also for facilitating the cooling of the same. For the purpose of increasing the irradiation of the frictional heat the outside of the casing may be provided with cooling ribs.

At the outside of the gear casing 1 a disc-like member 17 is mounted upon the gear shaft 2. Upon a projection 13 of this disc 17 and by means of a sliding collar 21 a disc 19 is disposed which, by means of pins or bolts 18 screw-threadedly secured therein is guided on the disc shaped body 17 in such a manner as to be capable of an axial displacement with relation to this body while being prevented from rotation. The disc 19, by means of springs 22 surrounding the guide pins 18 and seated in cavities 4 of an exterior flange 5 of the disc body 17 and bearing against abutments 6 secured to the outer ends of the pins 18, is, in the form of construction shown, forced to the right against the armature body 17. The disc 19 constitutes the armature of the main coupling 20 the magnet body 24 of which is secured upon the shaft 23 of the particular power engine. The magnet body 24 contains the usual magnet winding 25 to which the exciting current is admitted by means of the sliding rings 26 from a source of current 27. The frictional engagement between the armature 19 of the magnet body 24 is effected by a frictional ring 28.

In the left lower corner of the drawing an arrangement 29 is shown diagrammatically by means of which the switching in of the different stages of speed of the gearing according to the invention is effected. 30 indicates a disc rotatable upon a central axis 31, which disc on its underside carries a ballast or series resistance 32 subdivided in several stages. Above the contacts of this resistance a switch lever 33 is rotatably disposed which is electrically connected by a conductor 34 to one of the sliding rings 26 of the main coupling. The other sliding ring is directly connected to one terminal of the source of current 27 while the other terminal thereof by means of a conductor 35 is connected to one end of the ballast resistance 32. The switch lever 33 is adapted to slide over a plurality of contacts 37 by means of a contact piece 36, the said contacts being connected to one end of the magnet windings 9 of the individual couplings 7. The other ends of these windings are connected by the conductors 38 to one terminal of the source of current 39, the other terminal of which is connected to the switch lever 33 by the conductor 34. The switch lever is rotatable independently of the disc 30 to which it is connected by a spring 40 in such a manner that upon the rotation of the lever 33 in the direction of the arrow the disc 30 is carried along while putting tension upon the spring 40. This motion is, however, counter-acted and retarded by a liquid brake 41. The piston rod of this liquid brake is provided with a series of rack teeth adapted for engagement with a gear wheel 42 rigidly secured upon the disc 30.

The mode of operation of the device is substantially as follows: If it is, for instance, desired to effect the driving of a locomotive by means of a Diesel engine, the engine is first allowed to run idle. Thereupon the shaft 2 of the gearing may be operated by the switching in of the exciter current of the main coupling 20, which, if desired, may be effected gradually by the cutting out of a balance resistance, while the gear wheels 3, 3ª, 3ᵇ and 3ᶜ which are in engagement with the gear wheel of the secondary shaft 15 remain inoperative. The corresponding position of the switch lever 33 is shown in the drawing. If it is now desired to operate the gearing, the switch lever 33 is displaced as far as the first contact 37 belonging to the coupling 7ᶜ. The disc 30 with the balance resistance 32 is incapable of immediately following this movement on account of its being retarded by the brake 41, so as to cause a relative movement of the disc and of the lever 33 respectively, which causes the insertion of the resistance 32 into the exciter circuit of the main coupling. The force of engaging attraction of this coupling is therefore correspondingly reduced, as soon as the lever 33 has arrived at the lower one of the individual coupling contacts 37, causing the individual coupling 7ᶜ to be inserted so that upon the occurrence of the jar or blow taking place upon the operation of the coupling 7ᶜ this coupling is prevented from slipping while the main coupling is free to slip, until the number of rotations of the driven shaft 15 has become gradually increased. In the meantime the disc 30 with the balance resistance 32 lags behind and gradually comes up with the rate of motion of the switch lever 33, so that after a certain time the first contact piece of the resistance 32 will again become engaged with the switch arm 33, and in consequence thereof the resistance 32 is switched out from the exciting circuit, causing the force of attraction of the magnet of the main coupling 20 and consequently the maximum of torque which may be transmitted thereby to assume its normal value. In a corresponding manner the insertion of the other stages of speed of the gearing is effected. In each case upon the switching in of the particular coupling the force of engaging attraction on the main coupling is decreased, so that jars and blows may be absorbed by the latter.

The absolute dependence of the decrease of the force of attraction of the main coupling on the switching in of the individual coupling may, of course, also be effected by other positive means different from those hereinbefore described. Nor is it indispensably necessary to provide for positive or automatic dependence. It may be left to the machine operator to so adjust the force of engagement or attraction of the main coupling, as to correspond to the particular individual coupling which happens to be inserted. The sources of current 27 and 39, which in the exemplification shown, constitute batteries, may, of course, also be combined.

It may also be pointed out in this connection that the individual couplings as well as the main coupling may, of course, also be disposed upon the secondary shaft of the gearing and that the device described may also be utilized in connection with a reversing gear, or it may be combined with the latter. Other modifications and changes in the construction and arrangement of parts may be resorted to in accordance with the varying conditions of application and without deviating from the spirit of the invention as set forth in the claims hereunto appended.

I claim:—

1. Variable speed gear, comprising two shafts, a plurality of selectively operated driving members on said shafts, individual clutches for each of said driving members, a separate main clutch operatively associated with one of said shafts, means for simultaneously operating said main clutch and any one of said individual clutches, and means adapted to cause said main clutch to acquire its full operative activity in arrear of the full operation of the particular individual clutch.

2. Variable speed gear, comprising in combination a shafting, a plurality of selectively operated driving members on said shafting, individual electro-magnetic clutches on said shafting for each of said driving members, a separate electro-magnetic main clutch, and means adapted to cause said main clutch to acquire its full operative activity gradually during and in arrear of the full operation of one of said individual clutches.

3. Variable speed gear, comprising two shafts, a plurality of selectively operated driving members, a separate main clutch in connection with one of said shafts, means for operating any one of said individual clutches simultaneously with said main clutch in such a way as to cause the main clutch to slip upon the particular individual clutch being set in its full operative activity.

4. Variable speed gear, comprising two shafts, a plurality of selectively operated driving members on said shafts, individual electro-magnetic clutches for each of said driving members, a separate electro-magnetic main clutch in operative connection with one of said shafts, electrical means for operating said individual clutches comprising a plurality of individual circuits and a switch adapted to close said circuits one after the other, electrical means for operating said main clutch comprising a circuit and a ballast resistance connected to said circuit, switching means common to the last named circuit and to said first individual circuits and adapted upon being moved in one direction to first switch in said ballast resistance into said last named circuit and then to close one of said individual circuits.

5. Variable speed gear, comprising in combination, a shafting, a plurality of selectively operated driving members on said shafting, individual electro-magnetic clutches on said shafting for each of said driving members, a separate main clutch on said shafting, electrical operating means for the main clutch, separate operating means for said individual clutches and each comprising a circuit independent from said electrical operating means for the main clutch, and an adjustable ballast resistance, adapted to be inserted in the circuit of said electrical operating means for the main clutch when operating said operating means for said individual clutches.

6. Variable speed gear, comprising two shafts, a group of primary gear wheels mounted on one of said shafts, a group of secondary gear wheels mounted on the other of said shafts, the gear wheels of one group being in permanent engagement with the gear wheels of the other group, a plurality of individual electro-magnetic clutches, each of said clutches being adapted for the coupling of one of said gear wheels to its corresponding shaft, a casing enclosing said gear wheels and clutches, a third shaft, a main electro-magnetic clutch outside of said casing, adapted to connect one of said shafts to the third shaft, and means for preventing the full excitement of said main clutch upon the switching in of one of said individual clutches.

7. Variable speed gear, comprising two shafts, a group of primary gear wheels, mounted on one of said shafts, a group of secondary gear wheels mounted on the other of said shafts, the gear wheels of one group being in permanent engagement with the gear wheels of the other group, a plurality of individual electro-magnetic clutches, each of said clutches adapted for the coupling of one of said gear wheels to its corresponding shaft, a third shaft, a separate main electro-magnetic clutch adapted to connect one of said first named shafts to said third shaft, and automatically operating means for preventing the full excitement of said main clutch upon the switching in of one of said first named clutches.

8. Variable speed gear, comprising two shafts, a group of primary gear wheels, mounted upon one of said shafts, a group of secondary gear wheels, mounted upon the other one of said shafts and in engagement with the said primary gear wheels, a plurality of electro-magnetic multiple disc clutches, each of said clutches being adapted for coupling one of said wheels to its respective shaft; a casing enclosing said wheels and clutches, a third shaft, an electro-magnetic double-surface frictional clutch outside of said casing and adapted to connect one of said first named shafts to said third shaft, and means for preventing the full excitement of said double-surface frictional clutch upon the insertion of one of said multiple disc clutches.

9. Variable speed gear, comprising a primary shaft, a secondary shaft, an electro-magnetic main clutch adapted to connect said shafts to each other, a tertiary shaft, two sets of wheels, the wheels of one set mounted upon the secondary shaft, and the wheels of the second set mounted upon the tertiary shaft, certain of said wheels being loosely disposed upon their shaft, the wheels of one set being in operative engagement with the wheels of the other set, a plurality of electro-magnetic individual clutches adapted for the coupling of the loosely disposed wheels to their respective shaft, means for the insertion of each single individual clutch, and means for controlling the torque adapted to be transmitted by said clutch independently from the control of each of said individual clutches.

10. Variable speed gear, comprising a primary shaft, a secondary shaft, an electromagnetic frictional clutch adapted to couple said shafts to each other, a tertiary shaft, two groups of wheels, the wheels of one group being mounted upon the secondary, and the wheels of the second group being mounted upon the tertiary shaft, certain of said wheels loosely disposed upon their shaft and in operative engagement with the other wheels, a plurality of electro-magnetic multiple-disc clutches adapted to connect the loosely disposed wheels to their shaft, a casing enclosing said wheels and clutches, a double-surface main clutch outside of said casing, means for the switching in of each single clutch, and means for the switching in and the control of the maximum torque of said main clutch, regulating means for such control dependent upon the switching-in means of said single clutches in such a manner that upon the actuation of said switching-in means the regulating means are influenced to produce a weakening of the active torque of the main coupling.

11. Variable speed gear, comprising a primary shaft, a secondary shaft, an electromagnetic double-surface frictional clutch, adapted to couple said shafts to each other, a tertiary shaft, two sets of gear wheels, the wheels of one set being loosely mounted upon the secondary shaft, and the wheels of the other set being keyed to said tertiary shaft, the wheels of one set in engagement with the wheels of the other set, a plurality of single-electro-magnetic laminar clutches mounted upon said secondary shaft, and each single clutch adapted for the connection of one of the gear wheels loosely mounted upon said shaft to said shaft, and means for preventing the full excitement of said double-surface frictional clutch upon the insertion of one of the said laminar clutches.

12. Variable speed gear, comprising a primary shaft, a secondary shaft, an electromagnetic two-surface clutch, adapted for coupling said two shafts to each other, a tertiary shaft, two groups of gear wheels, the wheels of one group loosely mounted on their shafts, the wheels of the other group being keyed to their shafts, and the wheels of one group in engagement with the wheels of the other group, a plurality of electromagnetic laminar clutches, each of said laminar clutches being adapted for coupling one of the loosely mounted gear wheels to its shaft, electrically operated means for the switching-in of the individual laminar clutches, and electric means for effecting the regulation of the maximum torque of the two-surface clutch, said regulating means being dependent upon said switching means in such a manner as to cause the regulating means upon the operation of the switching means to produce a decrease of the normal torque of said two-surface friction clutch.

13. In a system of the class described a motor having a shaft, a second shaft, a main clutch adapted to couple said second shaft to the motor shaft, a third shaft, a plurality of selectively operating driving members on one of said shafts, individual electromagnetic clutches for each of said driving members, electro-magnetic means for operating said main clutch, operating means for said individual clutches, and means adapted to weaken the action of the main clutch upon the insertion of one of said individual clutches.

In testimony whereof I have signed my name to this specification.

JULIUS BING.